United States Patent Office 3,390,415
Patented July 2, 1968

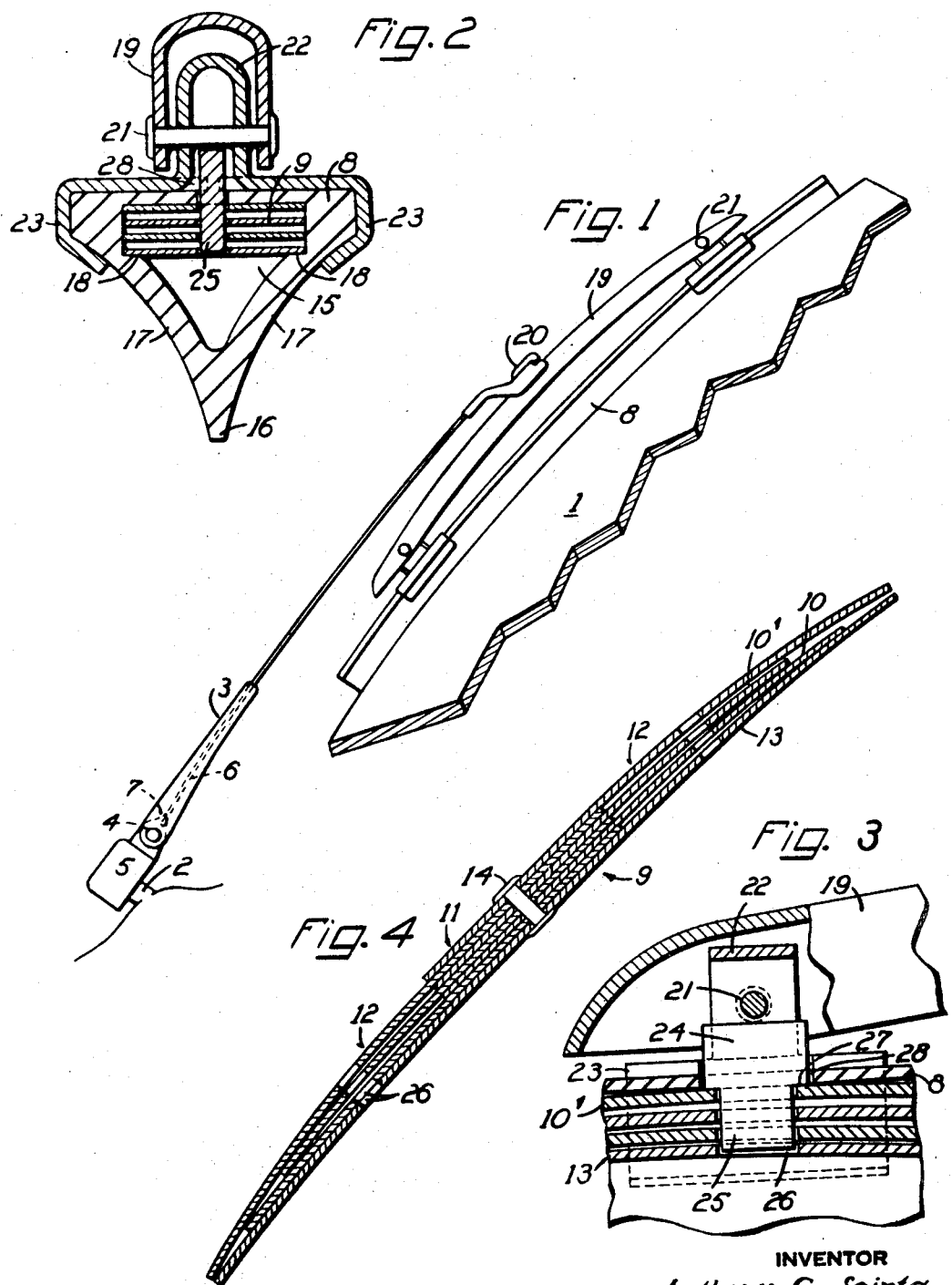

3,390,415
WIPING BLADE FOR CURVED WINDSHIELDS
Anthony C. Scinta, Buffalo, N.Y., assignor to Trico Products Corporation, Buffalo, N.Y.
Filed Dec. 22, 1945, Ser. No. 636,548
7 Claims. (Cl. 15—250.42)

This invention relates to the windshield cleaning art and more particularly to a wiper for cleaning windshields having curved surfaces. Wipers of an articulated design or construction have heretofore been proposed to clean such surfaces but it has been difficult to secure a clean wiping stroke because of the inability of the wiping edge to conform itself throughout to the curvature of the surface. Curved windshields may lack uniformity in curvature throughout the path of wiper movement and consequently a wiping edge given a set curve would obviously fail to perform satisfactorily when the surface contour changed.

The primary object of the present invention is to provide a wiper which will readily conform itself to the curved surface of a windshield and will clean the same in a satisfactory and practical manner. The invention further resides in a wiping blade having a degree of flexibility which will enable the wiping edge to follow the curved surface and maintain uniform contact therewith as the blade is oscillated back and forth along its path of travel.

A further object of the invention is to provide a surface conforming blade construction which will uniformly distribute the spring pressure from its carrying arm to the wiping edge for effectively cleaning the curved windshield surface in an efficient manner.

In the accompanying drawing, which discloses one practical embodiment of the present invention:

FIG. 1 is a side elevation of the improved wiper or blade associated with a curved windshield;

FIG. 2 is a transverse sectional view through the blade;

FIG. 3 is a fragment of the blade, in longitudinal section, depicting the manner of attaching its mounting bracket or clip; and FIG. 4 is a longitudinal sectional view through the pressure distributing spring backing of the blade.

Referring more particularly to the drawing, the numeral 1 designates a portion of a curved windshield over which the improved wiping blade is actuated by a carrying arm, the latter being fixed to an oscillatory shaft 2. The arm is of a well known construction and has an outer blade carrying section 3 joined by a pivot 4 to an inner shaft carried section 5, with a flat spring 6 extending from the outer section and bearing upon a fixed part 7 of the inner section to urge the blade into firm wiping contact with the windshield.

The wiping blade is in the form of a squeegee unit having a body 8, of rubber, which term includes like resilient and flexible substitutes, and a pressure distributing spring backing 9. According to FIG. 4, the backing is of strip form and is composed of a plurality of very thin spring leaves 10 overlapping at their inner ends and extending alternately in opposite directions and for progressively increasing distances. This provides a pressure distributing spring backing with a heavier central portion 11 and oppositely extending end portions 12 attenuating or tapering off toward their free extremities as regards their ability to sustain the load imposed by the spring arm 3, 4. A tie leaf 13 underlies for its entire length the composite leaf structure just described, and the uppermost leaves 10' may have their terminal portions substantially coextensive in length with the tie leaf to cooperatively inclose the stepped ends of the leaves when incorporated in the rubber body of the blade whereby the individual leaves may have freer movement during flexing of the backing. The several leaves may be joined with the tie leaf to form a unit, as by a rivet 14.

The spring backing unit may be attached to the rubber body 8 in a suitable manner. Preferably it is freely inserted in a chamber 15 in the body and interlocked in place against accidental displacement. This chamber may open through the opposite ends of the body and therefore constitute the latter as a tube. In width the chamber extends transversely of the body so as to support the leaf spring unit with the underfaces of the leaves opposing the surface being wiped. The wiping edge 16 of the body surface extends normal to the windshield surface as well as to the width of the spring backing unit. Consequently, the spring unit will yield and urge from and toward the windshield and thereby serve to conform the wiping edge 16 to the surface contour of the windshield. The wiping edge may be rendered more sensitive to the spring urge by making it hollow, as by extending the chamber 15 into the edge portion of the body. This will support the wiping edge by the thin converging walls 17 which lead from the opposed grooves or seat-forming shoulders 18 that provide sustaining support for the spring unit.

The wiper is mounted by means of a bracket which gives direct support to the end portions 12 and suspends the intermediate portion 11 between such points of support. To this end the bracket comprises an elongated primary yoke or bridge member 19 which is detachably connected to the outer end of the wiper arm section 3 by an attaching device 20. The opposite ends of the bracket member 19 are flexibly connected by pivot members 21 to upstanding ears 22 carried by the wiping blade. Each mounting ear is in the form of a spring loop which resiliently joins a pair of opposed jaws 23 and forms therewith rockable borders for firmly embracing the sides of the wiping blade. An interlocking key 24 is formed with a depending stem 25 to freely engage in registering openings 26 in the several leaves 10, 10', and 13, the key having shoulders 27 seating upon the uppermost leaves 10' as shown more clearly in FIG. 3. The pivot pin 21 overlies the key 24 to prevent upward displacement of the latter, and the key itself fits within notches 28 provided in the opposing jaw parts 23 for securing the jaws against longitudinal displacement on the blade. In other words, the jaws 23 and their connecting ears 22 serve as secondary yokes and constitute rockable supports for the longitudinally spaced end portions of the squeegee unit or wiping blade 8, 9, and these rockable supports are connected to the non-extensible flexible backing not only through the embraced thin elastic walls 17, but also positively through the key 24 in a manner to permit limited play for freedom of flexing of the backing in conforming the wiping edge to the curvature of the surface being wiped. The points of support as provided by the ears 22 and the interlocking keys 24 serve to support the intermediate portion 11 more or less under tension and against lateral distortion for supporting the intermediate blade portion in wiping contact with the glass surface.

The improved wiper is efficient in maintaining a clear field of vision through a curved windshield, the wiping edge being readily conformed to changes in the curvature of the surface as the wiper moves back and forth thereover. Therefore, while the foregoing description has been given in detail, it has been without the intention of limiting the invention since the inventive principles involved are capable of assuming other physical embodiments without departing from the spirit of the invention and the scope of the appended claims.

What is claimed is:

1. A wiper blade comprising an elongated body formed with a wiping edge extending lengthwise thereof, a spring backing for the body, and an elongated mounting bracket connected at its opposite ends to the wiping body, said spring backing comprising two sets of spring leaves arranged end to end and overlapping at their inner ends to form a relatively heavy intermediate backing portion between the points of attachment to the mounting bracket.

2. A wiper blade comprising an elongated body formed with a wiping edge extending lengthwise thereof, a spring backing for the body, and an elongated mounting bracket connected at its opposite ends to the wiping body, said spring backing comprising two spring leaves arranged end to end and overlapping at their inner ends to form a relatively heavy intermediate backing portion between the points of attachment to the mounting bracket, each leaf having registering openings, and key members freely fitting the openings and interlockingly connecting the spring backing to the mounting bracket.

3. A wiper blade comprising an elongated body formed with a wiping edge extending lengthwise thereof, a spring backing for the body, and an elongated mounting bracket connected at its opposite ends to the wiping body, said spring backing comprising a leaf spring having the superimposed leaves progressively shorter with the uppermost leaf being substantially coextensive with the lowermost leaf to house the shorter leaves.

4. A wiper blade for a curved surface, comprising a flexible elastic body having a wiping edge, spring leaf backing means interlocked with the elastic body to form a sequeegee unit and acting to give laterally stable and surface-conforming support to the wiping edge, and arm attaching means including spaced members each having opposed parts embracing the squeegee unit at longitudinally spaced points and extending about the opposite side margins of the backing means to hold it in a position for surface conformance, and a bracket member extending from one member to the other and rockably connected to said members for supporting the squeegee unit at such points to flex in a surface-conforming manner, said bracket member having an intermediate part connectible to an actuating arm.

5. A wiper blade for a curved surface, comprising a flexible elastic body having a wiping edge, spring leaf means interlocked with the elastic body to form a squeegee unit and acting to give surface-conforming support to the wiping edge, and arm attaching means including spaced rockable members each having opposed parts firmly embracing the squeegee unit to secure the rockable member in position thereon, the intermediate portion of each rockable member being elevated from the back of the squeegee unit, an elongated bracket member having its opposite terminal parts interfitting with the intermediate portions and movably connected thereto for supporting the squeegee unit in a manner to permit the medial portion of the unit flexing in surface-conforming engagement, and a key member received in the intermediate portion of each rockable member and extending down into a recess in the spring leaf means for holding the latter against displacement from the unit.

6. A wiper blade for a curved surface, comprising a flexible elastic body having a wiping edge, spring leaf means interlocked with the elastic body to form a squeegee unit and acting to give surface-conforming support to the wiping edge, and arm attaching means including spaced rockable members each having opposed parts firmly embracing the squeegee unit to secure the rockable member in position thereon, the intermediate portion of each rockable mmeber being elevated from the back of the unit, a key member received by the intermediate portion of each rockable member and having a part received by a recess in the spring leaf means for interlocking the latter against displacement from the unit, a bracket member extending from one rockable member to the other and connectible to an actuating arm, and a pin connecting each end of the bracket member to the intermediate portion of a respective one of the rockable members, said pin acting to hold the adjacent key member in its recess.

7. A windshield wiper unit comprising an elongated flexible body having a back portion and a wiping edge, said body having a triangularly-shaped chamber formed interiorly therein extending substantially throughout its length and positioned between said back portion and said wiping edge with two walls of the triangularly-shaped chamber converging toward the latter, and an elongated flexible supporting strip positioned in said chamber.

References Cited
UNITED STATES PATENTS

| | | | |
|---|---|---|---|
| 1,498,155 | 6/1924 | Dorr | 15—245 |
| 1,771,824 | 7/1930 | Storrie | 15—250.6 |
| 2,060,684 | 11/1936 | Moorhouse | 15—255 |
| 2,276,556 | 3/1942 | Zaiger | 15—250.7 |
| 2,230,489 | 2/1941 | Grossfield | 15—245 |
| 2,254,343 | 9/1941 | Zierer. | |
| 2,265,551 | 12/1941 | Steccone | 15—245 |
| 2,303,694 | 12/1942 | Horton | 15—250.8 X |

FOREIGN PATENTS

| | | |
|---|---|---|
| 820,156 | 7/1937 | France. |
| 504,083 | 4/1939 | Great Britain. |
| 427,383 | 4/1935 | Great Britain. |
| 433,467 | 8/1935 | Great Britain. |

CHARLES A. WILLMUTH, *Primary Examiner.*

SIDNEY JAMES, E. L. MORSE, *Examiners.*